US005923005A

United States Patent [19]
Blondiau et al.

[11] Patent Number: 5,923,005
[45] Date of Patent: Jul. 13, 1999

[54] EQUIPMENT FOR APPROACH AREA MONITORING FOR ESCALATOR AND TRAVELLING WALKWAYS

[75] Inventors: Dirk Blondiau; Josef Wiesinger, both of Vienna, Austria

[73] Assignee: Inventio AG, Hergiswil NW, Switzerland

[21] Appl. No.: 08/987,543

[22] Filed: Dec. 1, 1997

[30] Foreign Application Priority Data

Dec. 16, 1996 [EP] European Pat. Off. .............. 96810871

[51] Int. Cl.[6] .............................. B66B 1/34; B66B 13/26; B65G 15/00

[52] U.S. Cl. .......................... 187/392; 187/317; 198/321; 198/322; D25/62

[58] Field of Search .................................... 198/321, 322; 187/392, 317; D25/62

[56] References Cited

U.S. PATENT DOCUMENTS

| | | | |
|---|---|---|---|
| 1,985,563 | 12/1934 | Gerald | 198/16 |
| 5,001,557 | 3/1991 | Begle | 358/113 |
| 5,698,824 | 12/1997 | Platt | 187/317 |
| 5,704,464 | 1/1998 | Ahls et al. | 198/322 |
| 5,785,165 | 7/1998 | Stahlhut et al. | 198/322 |

FOREIGN PATENT DOCUMENTS

| | | |
|---|---|---|
| 0 621 225 | 10/1994 | European Pat. Off. . |
| 6087592 | 3/1994 | Japan . |
| 408996 | 4/1934 | United Kingdom . |

*Primary Examiner*—Robert E. Nappi
*Attorney, Agent, or Firm*—MacMillan, Sobanski & Todd, LLC

[57] ABSTRACT

Equipment for monitoring an approach area of a moving belt apparatus (1), such as an escalator or a travelling walkway, and for controlling a drive for the belt includes light sensors (12) arranged in handrail entry caps (11) of balustrades (3). Each light sensor (12) has an emitter (15) and a receiver (16) and operates with, for example, infrared beams. The light sensors (12) monitor the access to the moving belt apparatus (1) in a specific region (13) in front of an entry to the belt (2), for example, the region of the threshold plate (14). On stepping into the monitoring region (13) of the light sensor (12), the beams emitted by the emitter (15) are reflected by the person and sensed by the associated receiver (16) to switch on the drive.

9 Claims, 2 Drawing Sheets

EQUIPMENT FOR APPROACH AREA MONITORING FOR ESCALATOR AND TRAVELLING WALKWAYS

BACKGROUND OF THE INVENTION

The present invention relates to equipment for approach area monitoring for escalators and travelling walkways for the control of the drive.

In known controls for escalators, the drive is switched off in the case of an unused escalator. When passengers approach the escalator, for example, on passage through a light barrier, a signal is generated and the drive switched on. After elapse of a predetermined period of time, at the earliest after departure of the last passenger from the escalator, the drive is switched off again.

A control system for drives of escalators is shown in the U.S. Pat. No. 1,985,563 in which columns with a light barrier are arranged at the entrance to the escalator. If a passenger passes through the light beam, then the escalator standing in an unused state is switched on.

In the case of the above-described solution, the light barrier is arranged on separate columns and spaced from the escalator. This requires an additional and unneeded material and installation expenditure. Moreover, a passenger is not necessarily guided through the light barrier. A person who does not know the control system and who approaches the stationary escalator from the side can, by going around the light barrier, step onto the escalator without switching it on. This can arouse the disadvantageous impression of a defective or an unreliable escalator.

Moreover, as shown in the European Patent 0 621 225, a display and information device for an escalator is installed in the balustrade. This panel-like device is detachably connected to the balustrade. This device comprises several components, such as light barriers, indicator elements, etc.

A mode of operation as already described above is not possible by this light barrier. If a passenger steps onto the stationary escalator and interrupts the light barrier at the height of the handrail deflection, the drive is thereby switched on. In this case, an unpleasant state, possibly even dangerous and thereby unreasonable for the passenger, arises because the passenger is already standing on the steps of the escalator on start up. Furthermore, in this solution, an additional panel is also necessary in order to accommodate components such as the light barrier. This panel moreover diminishes the visual effect of the balustrade, which possibly consists of glass, and offers practically no protection against vandalism.

SUMMARY OF THE INVENTION

The present invention concerns a moving belt apparatus having a drive that is switched on when a person passes through a light barrier before stepping onto a belt driven by the drive. The apparatus includes a belt driven by a drive; a balustrade extending alongside the belt and forming a handrail deflection at an end of the belt, the balustrade being mounted on a balustrade pedestal and a handrail running on the balustrade; a threshold plate positioned adjacent the end of the belt in an entry region of the moving belt apparatus; and a light sensor positioned adjacent the handrail deflection for monitoring an approach area at the threshold plate and for generating a signal upon sensing a person in the entry region.

The invention is based on the object of proposing an approach area monitoring for escalators, for the control of the drive, of the kind stated in the introduction, which does not exhibit the aforesaid disadvantages and which in simple mode and manner enables an early recognition of passengers.

The advantages achieved by the invention are essentially that light sensors with emitters and receivers are arranged in the region of the handrail deflection and monitor the entire approach area of the escalator.

Due to the unobtrusive arrangement of the light sensors, instances of damage by vandalism or otherwise unintended are avoided as far as possible. The visual impression of the escalator remains unchanged. Moreover, no additional constructional elements are necessary at the balustrade or in the approach area.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
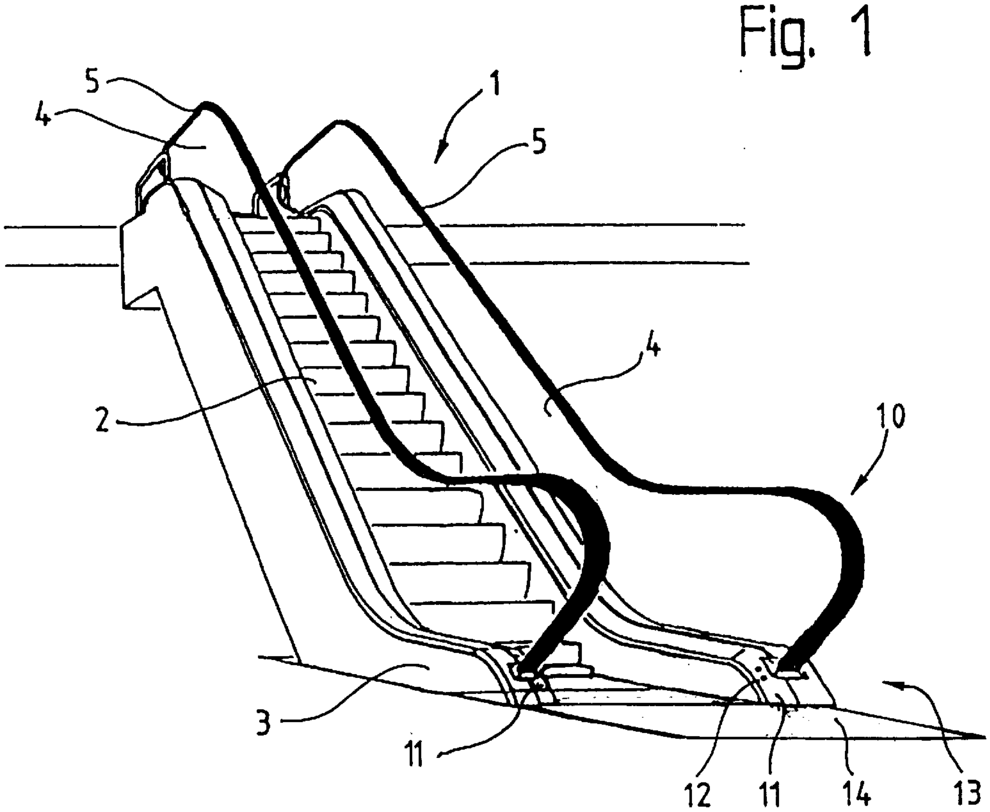
FIG. 1 is a schematic perspective view of an escalator incorporating the monitoring equipment according to the present invention.

FIG. 1 shows a schematic illustration of an escalator 1. The escalator 1 comprises a number of steps, which steps are connected as an endlessly circulating step belt 2 between two balustrade pedestals 3. A balustrade 4, on which an endless handrail 5 runs synchronously with the step belt, is installed on each balustrade pedestal 3. In the lower part of a handrail deflection or return 10, the handrail 5 is guided in each balustrade pedestal 3. The balustrade pedestal 3 is provided with handrail entry caps 11 in this region. Light sensors 12 are arranged at these handrail entry caps 11. These light sensors 22 monitor the entrance to the escalator 1 in a defined region 13 in front of the entry to the escalator 1, for example the region of a threshold plate 14.

Figure 2:
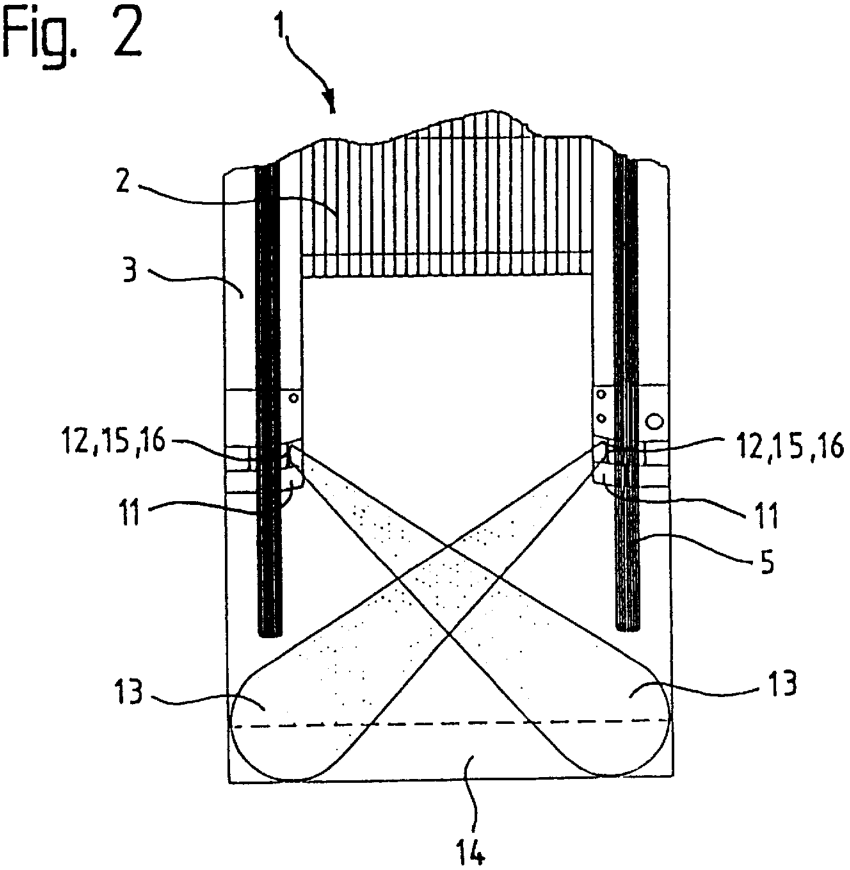
FIG. 2 is a fragmentary plan view of the bottom end of the escalator shown in the FIG. 1.

FIG. 2 shows a plan view detail of the escalator 1 in the region of the threshold plate 14. The light sensors 12 are integrated into the handrail end caps 11 and each consists of an emitter 15 and a receiver 16. Emitter 15 and receiver 16 operate on, for example, an infrared basis and respond to reflections by persons and objects. In the case of a person stepping into the monitoring region 13 of the light sensor 12, the beams emitted by the emitter 11 are reflected by the person or object and picked up by the associated receiver 16. This response of the light sensor 12 triggers a signal which is processed in an electronic part, not further described here, and conducted for starting of the drive of the escalator 1. If the light sensors 12 should fail, the escalator 1 remains in permanent operation.

As a further variant of embodiment, the light sensor 12 can be mounted on only one side in the handrail entry cap 11. Emitter 15 and receiver 16 must be so oriented and dimensioned in this case that the monitoring range 13 remains guaranteed as in the above-described example.

Figure 3:
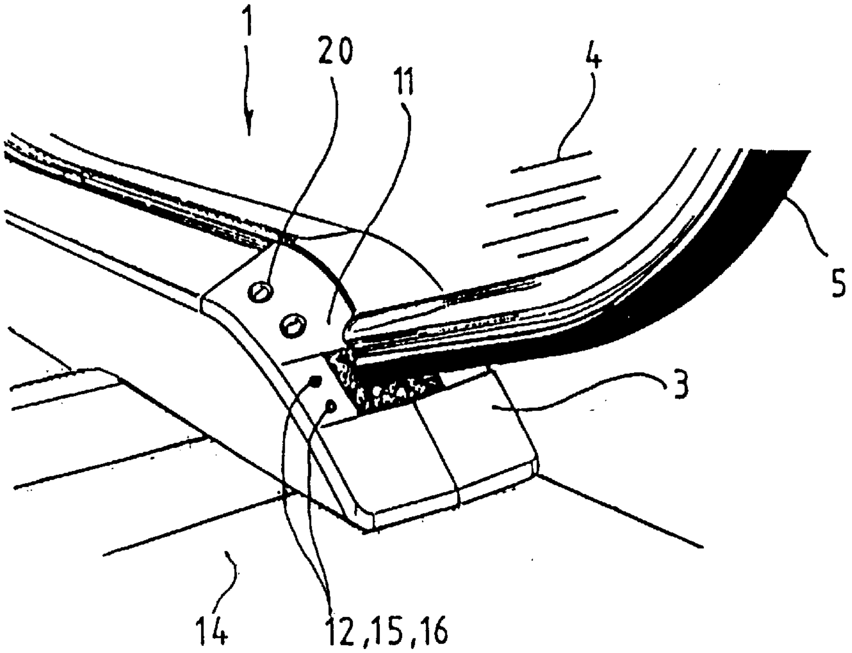
FIG. 3 is a fragmentary enlarged view of the right side bottom end of the escalator shown in the FIG. 1.

FIG. 3 shows a detailed view of the handrail entry cap 11 with the installed light sensor 12. Emitter 15 and receiver 16 are so integrated into the handrail entry cap 11 that they are virtually concealed from the user. This has the advantage that instances of damage of the light sensor 12 by vandalism or even unintentionally can be virtually excluded. Moreover, further operating elements, such as, for example, an emergency switch 20, can be arranged in the robust handrail entry cap 11. Equally, due to this arrangement of the light sensors 12 the expenditure on installation and material can be kept very small, as no additional lines leading away from the actual escalator 1 or from the balustrade pedestal 3 have to be laid or wired 10 up for the mounting.

Figure 4:
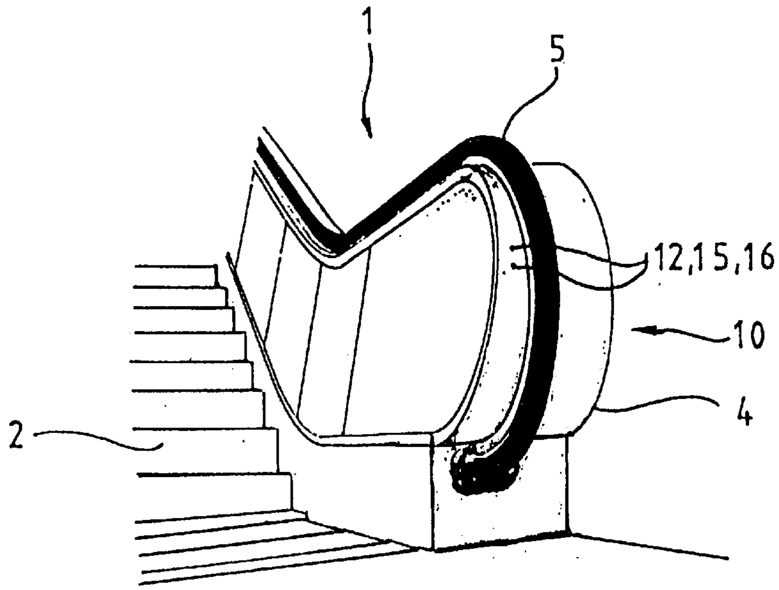
FIG. 4 is a view similar to the FIG. 3 of an alternate embodiment of the present invention.

FIG. 4 shows a further embodiment of an approach area monitoring for an escalator 1 or a travelling walkway in accordance with the invention. In that case the light sensors 12 with the emitter 15 and the receiver 16 are arranged to the right or the left of the handrail 5 in the balustrade 4 in the region of the handrail deflection 10. The mode of function is the same as in the above-described embodiment.

Although an escalator 1 has been shown and described, the equipment according to the present invention can be utilized with a travelling walkway. Typically, a travelling walkway is constructed in a manner similar to an escalator, but extends generally horizontally and has a continuous belt rather than individual steps connected in the belt 2. Thus, the equipment according to the present invention can be utilized to monitor and control the drive of any type of a moving belt apparatus that has a driven belt for moving people or objects.

The moving belt apparatus 1 has a drive that is switched on when a person passes through a light barrier before stepping onto the belt 2 driven by the drive comprises: the belt 2 driven by a drive; the balustrade 4 extending alongside the belt 2 and forming the handrail deflection 10 at an end of the belt 2, the balustrade 4 being mounted on the balustrade pedestal 3 and the handrail 5 running on the balustrade 4; the threshold plate 14 positioned adjacent the end of the belt 2 in an entry region of the moving belt apparatus 1; and the light sensor 12 positioned adjacent the handrail deflection 10 for monitoring an approach area at the threshold plate 14 and for generating a signal upon sensing a person in the entry region.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. Equipment for use in monitoring an entry region adjacent to an end of a belt of a moving belt apparatus and for controlling a drive for moving the belt, the moving belt apparatus further including at least one balustrade pedestal extending alongside the belt, a balustrade on the one balustrade pedestal and having a handrail deflection at the entry region, a threshold plate adjacent the end of the belt at the entry region, and a handrail entry cap on the one balustrade pedestal at a lower part of the handrail deflection, the moving belt apparatus switching on the drive to move the belt in response to a signal representing a person in the entry region, the equipment comprising: at least one light sensor integrally mounted in a handrail entry cap of a moving belt apparatus for monitoring an entry region at a threshold plate of the moving belt apparatus and for generating a signal upon sensing a person in the entry region, said one light sensor including an emitter for generating a light beam in a defined region of the entry region and an adjacent receiver for generating said signal upon sensing said light beam reflected from the person in said defined region whereby upon mounting of said light sensor, an opportunity for vandalism and damage of said light sensor is reduced and a visual impression of the moving belt apparatus remains unchanged.

2. The equipment according to claim 1 wherein said one light sensor is mounted in the handrail entry cap adjacent a handrail running on a balustrade and entering a balustrade pedestal on which the balustrade and the handrail entry cap are mounted.

3. The equipment according to claim 1 wherein said one light sensor generates an infrared light beam and responds to reflections of said infrared beam.

4. The equipment according to claim 1 wherein the moving belt apparatus is one of an escalator and a travelling walkway.

5. The equipment according to claim 1 including another light sensor integrally mounted in another handrail entry cap on a side of the moving belt apparatus opposite said one light sensor for monitoring the entry region and for generating said signal upon sensing a person in the entry region, said another light sensor including an emitter for generating another light beam in another defined region of the entry region and an adjacent receiver for generating said signal upon sensing said another light beam reflected from the person in said another defined region whereby upon mounting of said another light sensor, an opportunity for vandalism and damage of said another light sensor is reduced and a visual impression of the moving belt apparatus remains unchanged.

6. The equipment according to claim 5 wherein said light beams generated by said light sensors cross one another in the entry region.

7. Equipment for use in monitoring an entry region adjacent to an end of a belt of a moving belt apparatus and for controlling a drive for moving the belt, the moving belt apparatus further including at least one balustrade pedestal extending alongside the belt, a balustrade on the one balustrade pedestal and having a handrail deflection at the entry region, a threshold plate adjacent the end of the belt at the entry region, and a handrail entry cap on the one balustrade pedestal at a lower part of the handrail deflection, the moving belt apparatus switching on the drive to move the belt in response to a signal representing a person in the entry region, the equipment comprising: at least one light sensor integrally mounted in a handrail deflection of a balustrade of a moving belt apparatus for monitoring an entry region at a threshold plate of the moving belt apparatus and for generating a signal upon sensing a person in the entry region, said one light sensor including an emitter for generating a light beam in a defined region of the entry region and an adjacent receiver for generating said signal upon sensing said light beam reflected from the person in said defined region whereby upon mounting of said light sensor in the handrail deflection adjacent a handrail running on the balustrade, an opportunity for vandalism and damage of said light sensor is reduced and a visual impression of the moving belt apparatus remains unchanged.

8. A moving belt apparatus having a drive that is switched on, when a person is sensed in an entry region before stepping onto a belt driven by the drive comprising:

a belt driven by a drive;

a pair of balustrades extending along opposite sides of said belt and each forming a handrail deflection at an end of said belt at an entry region, each said balustrade being mounted on an associated balustrade pedestal and having a handrail running thereon, each said handrail entering said associated balustrade pedestal through an associated handrail entry cap;

a threshold plate positioned adjacent said end of said belt in said entry region; and at least one light sensor integrally mounted in one of said handrail deflections and said handrail entry caps for monitoring a first defined region of said entry region at said threshold plate, said one light sensor generating a first light beam in said first defined region and generating a first signal upon sensing a reflection of said first light beam from a person in said first defined region whereby upon mounting of said one light sensor, an opportunity for vandalism and damage of said one light sensor is reduced and a visual impression of the moving belt apparatus remains unchanged.

9. The moving belt apparatus according to claim 8 including another of said light sensors integrally mounted in one of said handrail deflections and said handrail entry caps on a side of said belt opposite said one light sensor for monitoring a second defined region of said entry region at said threshold plate, said another light sensor generating a second light beam in said second defined region of said entry region and generating a second signal upon sensing a reflection of said second light beam from a person in said second defined region and wherein said first and second light beams cross one another in said entry region.

* * * * *